(12) United States Patent
Ombe et al.

(10) Patent No.: US 11,198,469 B2
(45) Date of Patent: Dec. 14, 2021

(54) VEHICLE CONTROL PROCESSOR AND VEHICLE CONTROL METHOD

(71) Applicant: MAZDA MOTOR CORPORATION, Hiroshima (JP)

(72) Inventors: Shusaku Ombe, Hiroshima (JP); Hiroshi Ohmura, Hiroshima (JP); Kouji Hosoda, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 236 days.

(21) Appl. No.: 16/447,823

(22) Filed: Jun. 20, 2019

(65) Prior Publication Data
US 2020/0001916 A1     Jan. 2, 2020

(30) Foreign Application Priority Data

Jun. 29, 2018  (JP) .............................. JP2018-124167

(51) Int. Cl.
| | |
|---|---|
| *B62D 6/04* | (2006.01) |
| *B60Q 9/00* | (2006.01) |
| *B60W 10/00* | (2006.01) |
| *B60W 10/20* | (2006.01) |
| *B60W 30/12* | (2020.01) |

(Continued)

(52) U.S. Cl.
CPC .............. *B62D 6/04* (2013.01); *B60Q 9/008* (2013.01); *B60W 10/00* (2013.01); *B60W 10/20* (2013.01); *B60W 30/12* (2013.01); *B62D 15/025* (2013.01); *B60W 10/184* (2013.01); *B60W 2420/42* (2013.01); *B60W 2520/06* (2013.01); *B60W 2710/18* (2013.01); *B60W 2710/20* (2013.01); *B60W 2720/24* (2013.01); *B60Y 2300/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,603,215 | B2 * | 10/2009 | Matsumoto | G08G 1/167 701/300 |
| 2014/0111369 | A1 * | 4/2014 | Oh | B60Q 9/006 342/52 |

(Continued)

FOREIGN PATENT DOCUMENTS

JP          2017-174017 A       9/2017

*Primary Examiner* — Jeff A Burke
*Assistant Examiner* — Zachary Joseph Wallace
(74) *Attorney, Agent, or Firm* — Studebaker & Brackett PC

(57) ABSTRACT

A vehicle control processor and method capable of preventing departure to an off-road, to reduce driver discomfort, irritation and stress. The control processor calculates a width of a side strip between a left mark line and a road end based on information from a camera. When the width is wider than a specified width, steering torque based on first and second steering characteristics are exerted. The steering torque based on the first steering characteristic is exerted when a vehicle lateral end is located within a range from a left mark line outer end to a characteristic switching position, set in accordance with the width of the side strip between the left mark line and the road end, and the steering torque based on the second steering characteristic is exerted when the vehicle lateral end is located within a range from the characteristic switching position to the road end.

15 Claims, 12 Drawing Sheets

(51) Int. Cl.
*B62D 15/02* (2006.01)
*B60W 10/184* (2012.01)

(56) References Cited

U.S. PATENT DOCUMENTS

2014/0229073 A1* 8/2014 Mori .................... B62D 15/025
  701/42
2017/0166254 A1* 6/2017 Katoh .................... B62D 6/005
2019/0299991 A1* 10/2019 Horii ............... B60W 60/00274

* cited by examiner

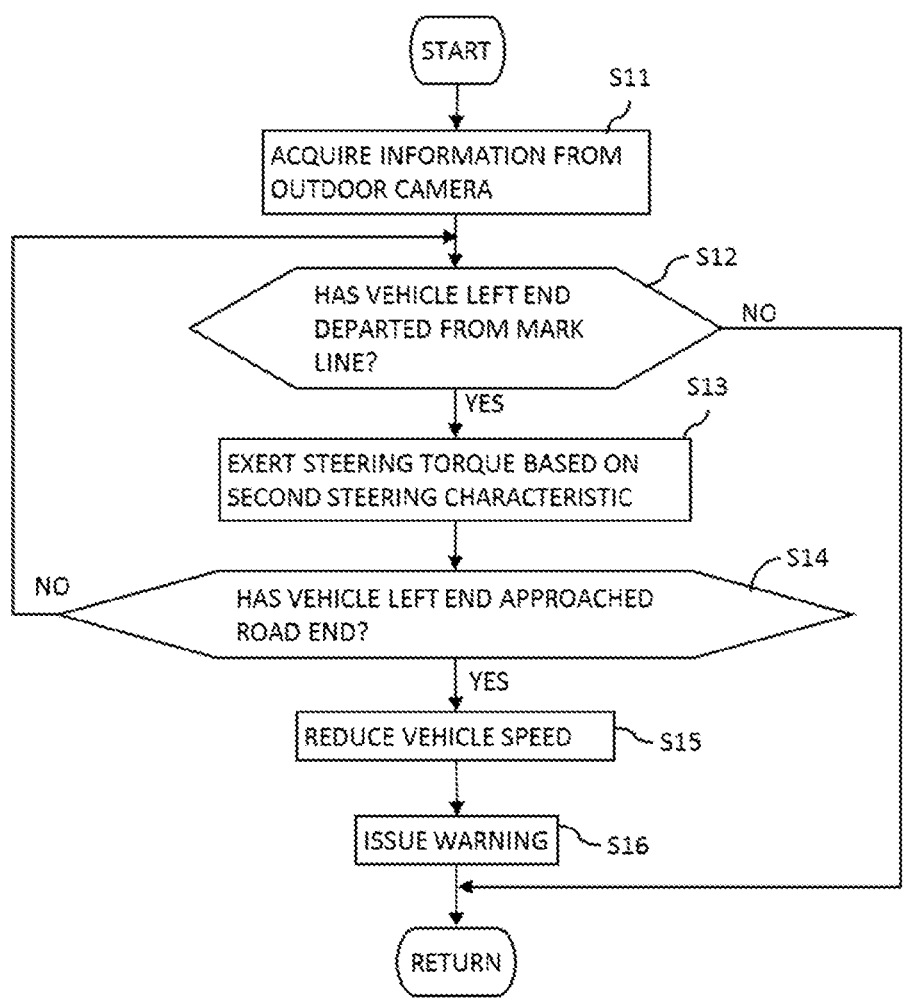

VEHICLE CONTROL PROCESSOR AND VEHICLE CONTROL METHOD

BACKGROUND

Technical Field

The present disclosure relates to a vehicle control processor and a vehicle control method and, in particular, to a steering assist technique.

Background Art

A vehicle such as an automobile, to which a steering assist technique for avoiding lane departure is applied as a type of an accident prevention technique, has been available. For example, Japanese Patent Laid-Open publication No. 2017-174017 discloses a technique of exerting a steering force to prevent the lane departure of the vehicle at the time when the vehicle is about to move out of the lane.

In the technique disclosed in the above-described patent document, an on-board camera is used to detect a roadway outer line (a mark line) and a road end. Then, in accordance with a width between the roadway outer line and the road end, a steering force exertion start position is set on an inner side (a lane side) of the roadway outer line.

With the technique disclosed in the above-described patent document, the steering force that urges the vehicle to move back into the lane is exerted when the vehicle approaches the roadway outer line. Thus, it is possible to prevent the vehicle from departing to the road end side beyond the roadway outer line.

However, the technique disclosed in the above-described patent document may cause a driver to have senses of discomfort and irritation and may give the driver considerable stress.

More specifically, in the technique disclosed in the above-described patent document, in a situation where the vehicle travels on the lane while keeping a substantially constant distance from the roadway outer line, the steering force is exerted to avoid the departure, or an amount of the exerted steering force changes every time the width between the roadway outer line and the road end changes. With the technique disclosed in the above-described patent document, which may cause such a circumstance, the driver acquires the senses of discomfort and irritation. Consequently, the technique may cause the driver to receive the significant stress.

SUMMARY

The present disclosure provides a vehicle control processor and a vehicle control method capable of preventing occurrence of an accident by preventing departure to an off-road, while hindering a driver from having senses of discomfort and irritation and receiving stress.

A vehicle control apparatus according to an aspect of the present disclosure is capable of exerting a steering force for suppressing departure of a vehicle to an off-road on the vehicle in accordance with a travel situation. The vehicle includes a steering force generating section that generates the steering force for the vehicle; a mark line detecting section that detects a mark line extending along a travel direction of the vehicle on one lateral side of the vehicle; and a road end detecting section that detects a road end on the one lateral side, the road end being adjacent to an outer side of the vehicle from the mark line and extending along the travel direction. The vehicle control apparatus includes a vehicle control processor that successively receives a detection result from each of the mark line detecting section and the road end detecting section and, based on the detection results, commands the steering force generating section to exert the steering force on the vehicle.

The vehicle control processor includes a first steering force exerting section that commands the steering force generating section to exert a first steering force, which is the steering force based on a first steering characteristic, in the case where the vehicle departs to the road end side from the mark line; and a second steering force exerting section that commands the steering force generating section to exert a second steering force, which is the larger steering force than the first steering force, on the basis of a second steering characteristic differing from the first steering characteristic in the case where the vehicle departs to the road end side from the mark line.

The first steering force is exerted with an outer end on the road end side of the mark line as an origin, and the second steering force is exerted with the road end as a reference and a position between the outer end and the road end as an origin.

In the above-described vehicle control apparatus, the vehicle control processor commands the steering force generating section to exert the steering force in the case where the vehicle departs the mark line to the road end side. Accordingly, the steering force is not exerted within a range where the vehicle travels on a lane. Thus, unnecessary intervention by the control is prevented, and a driver is hindered from having senses of discomfort and irritation and thus from receiving stress during driving. That is, as long as the vehicle travels on the lane, the exertion of the steering force as in the technique disclosed in the above-described patent document is not made in the above vehicle control apparatus. Thus, even when a width of a side strip is changed, the unnecessary steering force is not exerted, and the steering force is not changed.

In addition, in the above vehicle control processor, the first steering force is exerted with the mark line outer end as the origin, and the second steering force is exerted with the road end as the reference and the position between the mark line outer end and the road end as the origin. Thus, a high degree of safety can be secured while the unnecessary intervention by steering control is prevented. That is, in such a case where the lateral end of the vehicle is located on the mark line, the steering force is not exerted. When the lateral end of the vehicle departs the mark line to the road end side, the steering force is exerted for the first time. Thus, the unnecessary exertion of the steering force can be prevented.

Therefore, the above vehicle control processor prevents occurrence of an accident by preventing departure to the off-road, while hindering the driver from having the senses of discomfort and irritation and receiving the stress.

In the vehicle control processor according to the above aspect, the vehicle control processor can selectively execute the following in accordance with the width of the side strip between the mark line and the road end:

first steering control in which the steering force generating section generates the first steering force in the case where the lateral end of the vehicle is located within a range from the mark line to a specified position between the mark line and the road end and in which the steering force generating section generates the second steering force in the case where the lateral end of the vehicle is located within a range from the specified position to the road end; or second steering control in which the steering force generating section generates the second steering force in the case where the lateral end of the vehicle is located within a range from the mark line to the road end.

In the vehicle control processor that adopts the above configuration, the first steering control or the second steering control is selectively executed in accordance with the width of the side strip. Thus, by selecting a control method in accordance with the travel situation, the high degree of safety can be secured while the intervention by the steering control is minimized.

More specifically, in the case where the width of the side strip is comparatively wide (relatively wide), the above first steering control is executed to initially exert the first steering force from the mark line side toward the road end side and then exert the second steering force. Accordingly, the high degree of safety can be secured with the minimum intervention by the control corresponding to a degree of the departure of the vehicle. Meanwhile, in the case where the width of the side strip is comparatively narrow (relatively narrow), the second steering force is initially exerted from a time when the vehicle departs the mark line. Thus, the high degree of safety can be secured.

In the vehicle control processor according to the above aspect, the vehicle control processor can further include a switching position setting section that sets the specified position to the road end side as the width of the side strip is increased and that sets the specified position to the mark line side as the width of the side strip is reduced during execution of the first steering control.

In the vehicle control processor that adopts the above configuration, the region where the first steering force based on the first steering characteristic is exerted and the region where the second steering force based on the second steering characteristic is exerted are switched at the above specified position. Thus, in the case where the vehicle further approaches the road end side, the second steering force, which is clearly large, is exerted, so as to be able to secure the high degree of safety.

In the vehicle control processor according to the above aspect, each of the first steering characteristic and the second steering characteristic can have a steering force increased section in which the steering force is gradually increased from the mark line side toward the road end side.

In the vehicle control processor that adopts the above configuration, the steering force is gradually increased when the vehicle departs from the mark line side toward the road end side. Thus, compared to a case where the large steering force is exerted all at once immediately after the vehicle departs the mark line, it is possible to hinder the driver from receiving the stress.

In the vehicle control processor according to the above aspect, the vehicle control processor can make at least one of a reduction of a vehicle speed and issuance of a warning in the case where the vehicle departs to such a state of approaching the road end.

In the vehicle control processor that adopts the above configuration, in the case where the vehicle approaches the road end, at least one of the reduction of the vehicle speed and the issuance of the warning is made to prevent the departure to the off-road. Thus, the high degree of safety can be secured.

In the vehicle control processor according to the above aspect, the vehicle can include an image capturing device capable of capturing an image of outside of a cabin, and the image capturing device can have functions of both of the mark line detecting section and the road end detecting section.

In the vehicle control processor that adopts the above configuration, the image capturing device has the functions of both of the mark line detecting section and the road end detecting section. Thus, compared to a case where separate devices are provided for the sections, manufacturing cost of the vehicle can be reduced. In addition, it is possible to suppress a space for providing the mark line detecting section and the road end detecting section in the vehicle to be small.

A vehicle control method according to another aspect of the present disclosure is a vehicle control method that exerts a steering force for suppressing departure of a vehicle to an off-road on the vehicle in accordance with a travel situation. The vehicle control method includes: a mark line detecting step of detecting a mark line extending along a travel direction of the vehicle on one lateral side of the vehicle; a road end detecting step of detecting a road end on the one lateral side, the road end being adjacent to an outer side of the vehicle from the mark line and extending along the travel direction; and a steering force exerting step of exerting the steering force on the vehicle on the basis of a detection result detected in each of the mark line detecting step and the road end detecting step. The steering force exerting step includes a first steering force exerting sub-step of exerting a first steering force, which is the steering force based on a first steering characteristic, in the case where the vehicle departs to the road end side from the mark line; and a second steering force exerting sub-step of exerting a second steering force, which is the larger steering force than the first steering force, on the basis of a second steering characteristic differing from the first steering characteristic in the case where the vehicle departs to the road end side from the mark line. The first steering force is the steering force that is exerted with an outer end on the road end side of the mark line as an origin, and the second steering force is the steering force that is exerted with the road end as a reference and a position between the outer end and the road end as an origin.

In the above-described vehicle control method, the steering force is exerted in the steering force exerting step in the case where the vehicle departs the mark line to the road end side. Accordingly, in the above vehicle control method, the steering force is not exerted within a range where the vehicle travels on a lane. Thus, the unnecessary intervention by the control is prevented, and the driver is hindered from receiving the senses of discomfort and irritation and thus from receiving stress during driving. That is, as long as the vehicle travels on the lane, the exertion of the steering force as in the technique disclosed in above Japanese Patent Laid-Open publication No. 2017-174017 is not made in the above vehicle control method. Thus, even when the width of the side strip is changed, the unnecessary steering force is not exerted, and the steering force is not changed.

In the above vehicle control method, the first steering force is exerted with the mark line outer end as the origin, and the second steering force is exerted with the road end as the reference and the position between the mark line outer end and the road end as the origin. Accordingly, in such a case where the lateral end of the vehicle is located on the mark line, the steering force is not exerted. When the lateral end of the vehicle departs the mark line to the road end side, the steering force is exerted for the first time. Thus, the unnecessary exertion of the steering force can be prevented.

Therefore, the above vehicle control method prevents the occurrence of the accident by preventing the departure to the off-road, while hindering the driver from having the senses of discomfort and irritation and receiving the stress.

In the vehicle control method according to the above aspect, the following can selectively be executed in the steering force exerting step: first steering control in which, in accordance with the width of the side strip between the mark line and the road end, the first steering force is exerted in the case where the lateral end of the vehicle is located within a range from the mark line to a specified position between the mark line and the road end and in which the second steering force is exerted in the case where the lateral end of the vehicle is located within a range from the specified position to the road end; or second steering control in which the second steering force is exerted in the case where the lateral end of the vehicle is located within a range from the mark line to the road end.

In the vehicle control method that adopts the above configuration, the first steering control or the second steering control is selectively executed in accordance with the width of the side strip. Thus, by selecting the control method in accordance with the travel situation, the high degree of safety can be secured while the intervention by the steering control is minimized.

More specifically, in the case where the width of the side strip is comparatively wide (relatively wide), the above first steering control is executed to initially exert the first steering force from the mark line side toward the road end side and then exert the second steering force. Accordingly, the high degree of safety can be secured with the minimum intervention by the control corresponding to the degree of the departure of the vehicle. Meanwhile, in the case where the width of the side strip is comparatively narrow (relatively narrow), the second steering force is initially exerted from a time when the vehicle departs the mark line. Thus, the high degree of safety can be secured.

In the vehicle control method according to the above aspect, the steering force exerting step can further include a switching position setting sub-step of setting the specified position to the road end side as the width of the side strip is increased and setting the specified position to the mark line side as the width of the side strip is reduced during execution of the first steering control.

In the vehicle control method that adopts the above configuration, the region where the first steering force based on the first steering characteristic is exerted and the region where the second steering force based on the second steering characteristic is exerted are switched at the above specified position. Thus, in the case where the vehicle further approaches the road end side, the second steering force, which is clearly large, is exerted, so as to be able to secure the high degree of safety.

In each of the above aspects, the occurrence of the accident is prevented by preventing the departure to the off-road, while hindering the driver from having the senses of discomfort and irritation and receiving the stress.

BRIEF DESCRIPTION OF THE DRAWINGS

FIG. 8 is a flowchart illustrating second steering control that is executed by the control processor.

DETAILED DESCRIPTION

Figure 1:
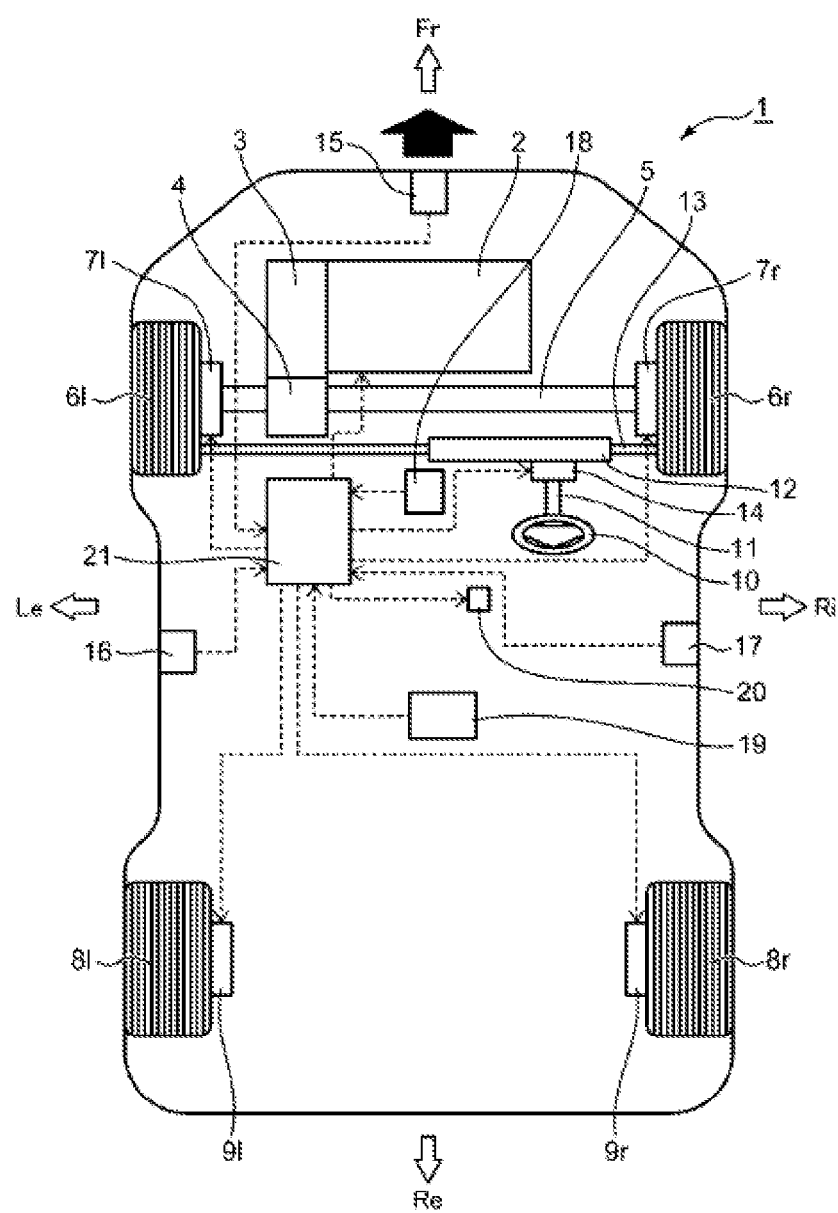
FIG. 1 is a schematic view illustrating a schematic configuration of a vehicle according to an embodiment.

A description will hereinafter be made on an embodiment of the present disclosure with reference to the drawings. Note that the embodiment, which will be described below, is merely one example of the present disclosure, and thus the present disclosure is not limited to the following embodiment in any respect except for an essential configuration thereof.

In the drawings, which will be used in the description below, "Fr", "Re", "Le", and "Ri" respectively indicate a front side (an advancing direction) of a host vehicle, a rear side of the host vehicle, a left side of the host vehicle, and a right side of the host vehicle.

Embodiment

1. Schematic Configuration of Vehicle 1

A description will be made on a schematic configuration of a vehicle 1 according to this embodiment with reference to FIG. 1 and FIG. 2.

As illustrated in FIG. 1, the vehicle 1 includes an engine 2 as a power source. As an example of the engine 2, a multi-cylinder gasoline engine is adopted for the vehicle 1 according to this embodiment.

A transmission 3 is coupled to the engine 2, and a differential gear 4 is coupled to the transmission 3. A driveshaft 5 extends in a lateral direction from the differential gear 4. Left and right front wheels 6l, 6r are attached to ends of the driveshaft 5.

A left front brake 7l is provided in a portion of the driveshaft 5 near the left front wheel 6l, and a right front brake 7r is provided in a portion of the driveshaft 5 near the right front wheel 6r.

Left and right rear wheels 8l, 8r are disposed in a rear portion of the vehicle 1. Each of the left and right rear wheels 8l, 8r is attached to a rear arm, which is not illustrated. A left rear brake 9l is provided on a shaft (not illustrated) that axially supports the left rear wheel 8l, and a right rear brake 9r is provided on a shaft (not illustrated) that axially supports the right rear wheel 8r.

As illustrated in FIG. 1, in a cabin of the vehicle 1, a steering wheel 10 is disposed in a portion in front of a driver's seat. The steering wheel 10 is attached to a tip portion of a steering shaft 11. The other end of the steering shaft 11 is connected to a steering gear 12. A steering actuator 14 is also connected to the steering shaft 11 and can exert steering torque (a steering force) on the steering shaft 11. That is, in the vehicle 1, the steering actuator 14 functions as a steering force generating section that generates the steering force.

A tie rod 13 is connected to the steering gear 12. Orientations of the front wheels 6l, 6r are changed in conjunction with lateral movement of the tie rod 13.

As illustrated in FIG. 1, the vehicle 1 is provided with three radars 15, 16, 17 and an outdoor camera (an image capturing device) 18. Of the three radars 15, 16, 17, the radar 15 is disposed in a front portion of the vehicle 1, and the two remaining radars 16, 17 are disposed on sides of the vehicle 1. Each of these radars 15, 16, 17 has functions of detecting a vehicle around the host vehicle (the vehicle 1) and detecting a relative speed and a relative distance of the vehicle 1 to the peripheral vehicle.

The outdoor camera 18 detects a mark line and a road end ahead of the vehicle 1. That is, in the vehicle 1 according to this embodiment, the outdoor camera 18 is a mark line detecting section (a roadway outer line detecting section and a roadway center line detecting section) that detects the mark lines (a roadway outer line, a roadway center line, and the like) on both sides of a travel lane and is a road end detecting section that detects the road end located on an off-road side of the mark line.

In addition, the vehicle 1 is provided with a map information memory 19. The map information memory 19 stores information on a road where the vehicle 1 travels, and the like. Map information stored in the map information memory 19 includes lane information of the road.

The vehicle 1 includes an alarm 20 capable of issuing a warning to an occupant. The vehicle 1 is further provided with a control processor (a vehicle control processor) 21. The control processor 21 is configured to include a microprocessor that is constructed of a CPU, ROM, RAM, and the like, and, as illustrated in FIG. 1 and FIG. 2, is connected to the radars 15, 16, 17, the outdoor camera 18, the map information memory 19, and the like, and is configured to receive various types of the information.

In addition, the control processor 21 can command the engine 2, the steering actuator 14, the alarm 20, and the brakes 7l, 7r, 9l, 9r on the basis of the received information.

Figure 2:
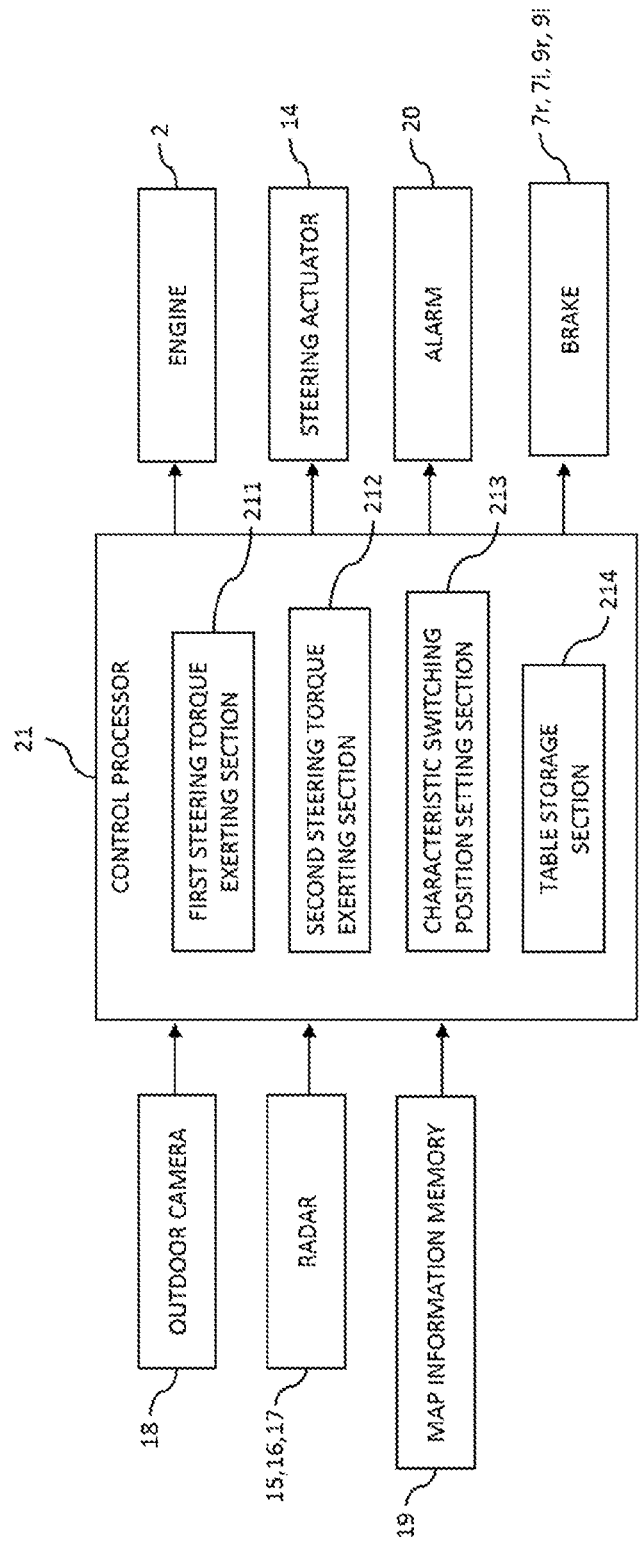
FIG. 2 is a block diagram illustrating a control configuration of the vehicle.

Furthermore, as illustrated in FIG. 2, the control processor 21 includes a first steering torque exerting section (a first steering force exerting section) 211, a second steering torque exerting section (a second steering force exerting section) 212, a characteristic switching position setting section (a switching position setting section) 213, and a table storage section 214. These will be described below.

2. Detection of Mark Lines $DL_L$, $DL_R$ and Road End $E_{RL}$ by Outdoor Camera 18

Figure 3:
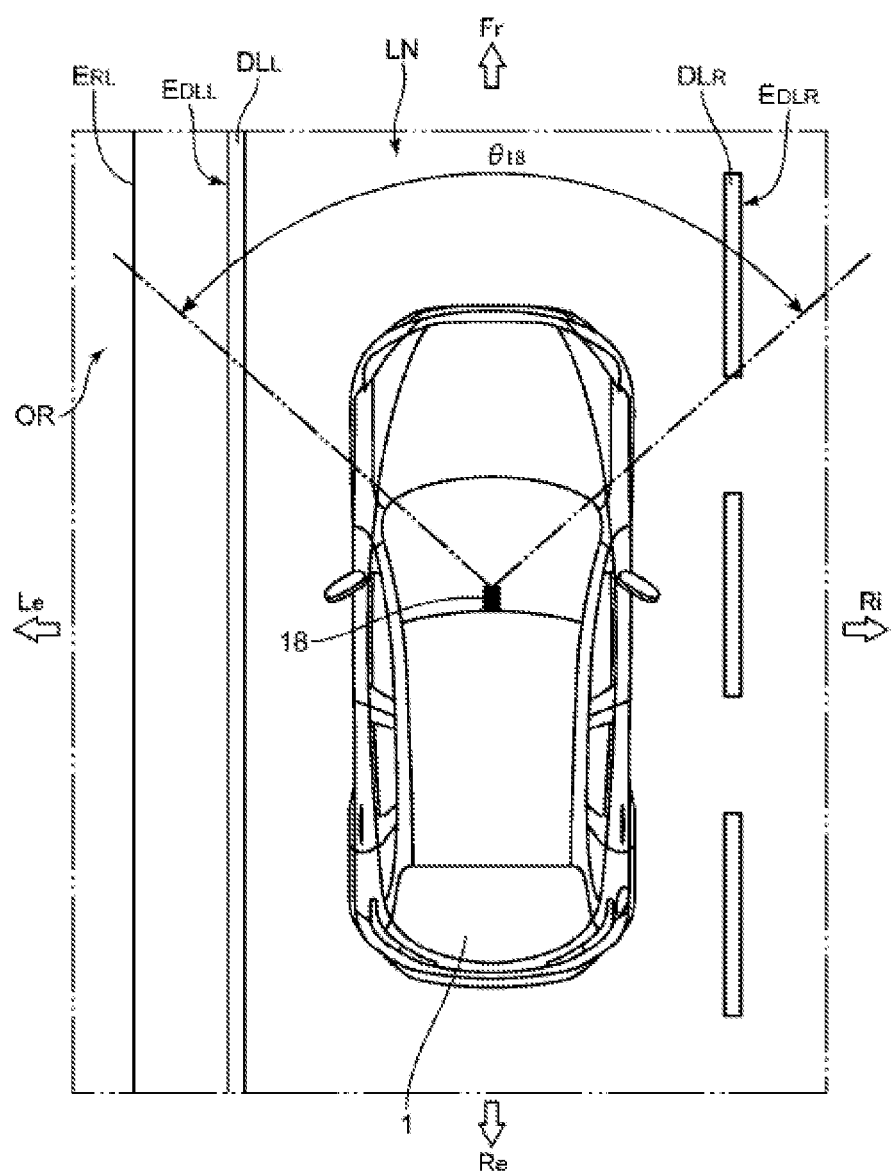
FIG. 3 is a schematic view illustrating detection of a mark line and a road end by an outdoor camera.

A description will be made on the detection of mark lines $DL_L$, $DL_R$ and a road end $E_{RL}$, by the outdoor camera 18 with reference to FIG. 3. FIG. 3 is a schematic view illustrating the detection of the mark lines $DL_L$, $DL_R$ and the road end $E_{RL}$ by the outdoor camera 18.

As illustrated in FIG. 3, the outdoor camera 18, which is provided on a cabin inner side of a front windshield of the vehicle 1, can detect a front range $\theta_{18}$ of the vehicle 1.

Here, in this embodiment, as an example, the vehicle 1 travels on a left travel lane LN. A left mark line (a roadway outer line) $DL_L$ is provided on a left side of the lane LN, and a right mark line (a roadway center line) $DL_R$ is provided on a right side of the lane LN. The road end $E_{RL}$ is provided on a further left side of the roadway outer line $D_{LL}$.

The outdoor camera 18 can at least detect the roadway outer line $DL_L$, the roadway center line $DL_R$, and the road end $E_{RL}$. Note that respective outer ends $E_{DLL}$, $E_{DLR}$ of the mark lines $DL_L$, $DL_R$ can also be detected in the detection of the roadway outer line $DL_L$ and the roadway center line $DL_R$ by the outdoor camera 18.

Note that the road end $E_{RL}$ is a boundary between a side strip on the left side (the outer side) of the roadway outer line $DL_L$ and an off-road OR. The control processor 21 stores various modes of the road end $E_{RL}$ corresponding to road conditions. The control processor 21 conclusively determines the road end $E_{RL}$ in consideration of the road information and the like acquired from the map information memory 19.

3. Travel Situation of Vehicle 1

Figure 4:
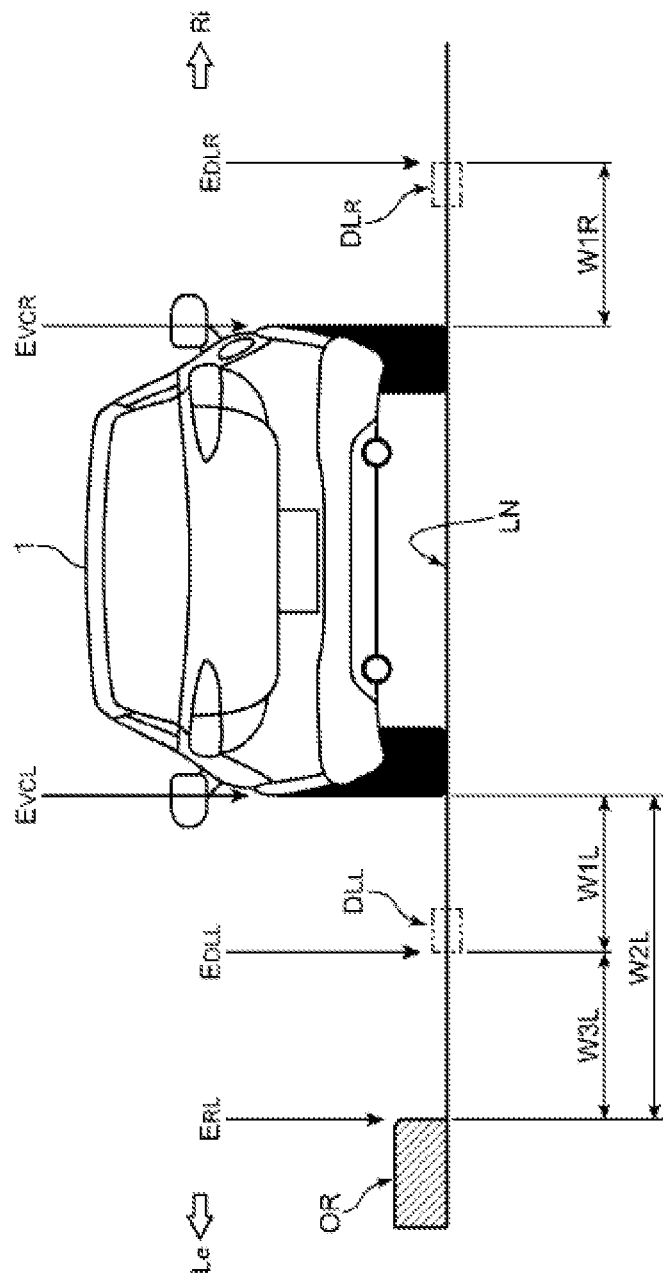
FIG. 4 is a schematic view illustrating positions of the vehicle, the mark lines, and the road end.

Next, a description will be made on a travel situation of the vehicle 1, which will be assumed as an example, with reference to FIG. 4. FIG. 4 is a schematic view illustrating positions of the vehicle 1, the mark lines $DL_L$, $DL_R$, and the road end $E_{RL}$ in a state where the vehicle 1 is seen from the rear side.

As illustrated in FIG. 4, the vehicle 1 travels on the lane LN. In addition, the roadway outer line $DL_L$, which is detected by the outdoor camera 18, exists on a left side of the vehicle 1, and the road end $E_{RL}$ exists on the further left side. In this embodiment, as an example, the off-road OR on an outer side of the road end $E_{RL}$ is made one step higher than the lane LN and the side strip between the roadway outer line $DL_L$ and the road end $E_{RL}$ by a curb. In addition, the roadway center line $DL_R$ exists on a right side of the vehicle 1.

A width between a vehicle left end $E_{VCL}$ as a left end of the vehicle 1 (a lateral end of the vehicle 1) and the left mark line outer end $E_{DLL}$ of the roadway outer line $DL_L$ is W1L. A width between the vehicle left end $E_{VCL}$ of the vehicle 1 and the road end $E_{RL}$ is W2L. In the situation illustrated in FIG. 4, a width of the side strip is W3L (=W2L−W1L).

Meanwhile, a width between a vehicle right end $E_{VCR}$ as a right end of the vehicle 1 and the right mark line outer end $E_{DLR}$ of the roadway center line $DL_R$ is W1R.

4. Steering Control in the Case where Width W3L of Side Strip is Relatively Wide (First Steering Control)

Figure 5:
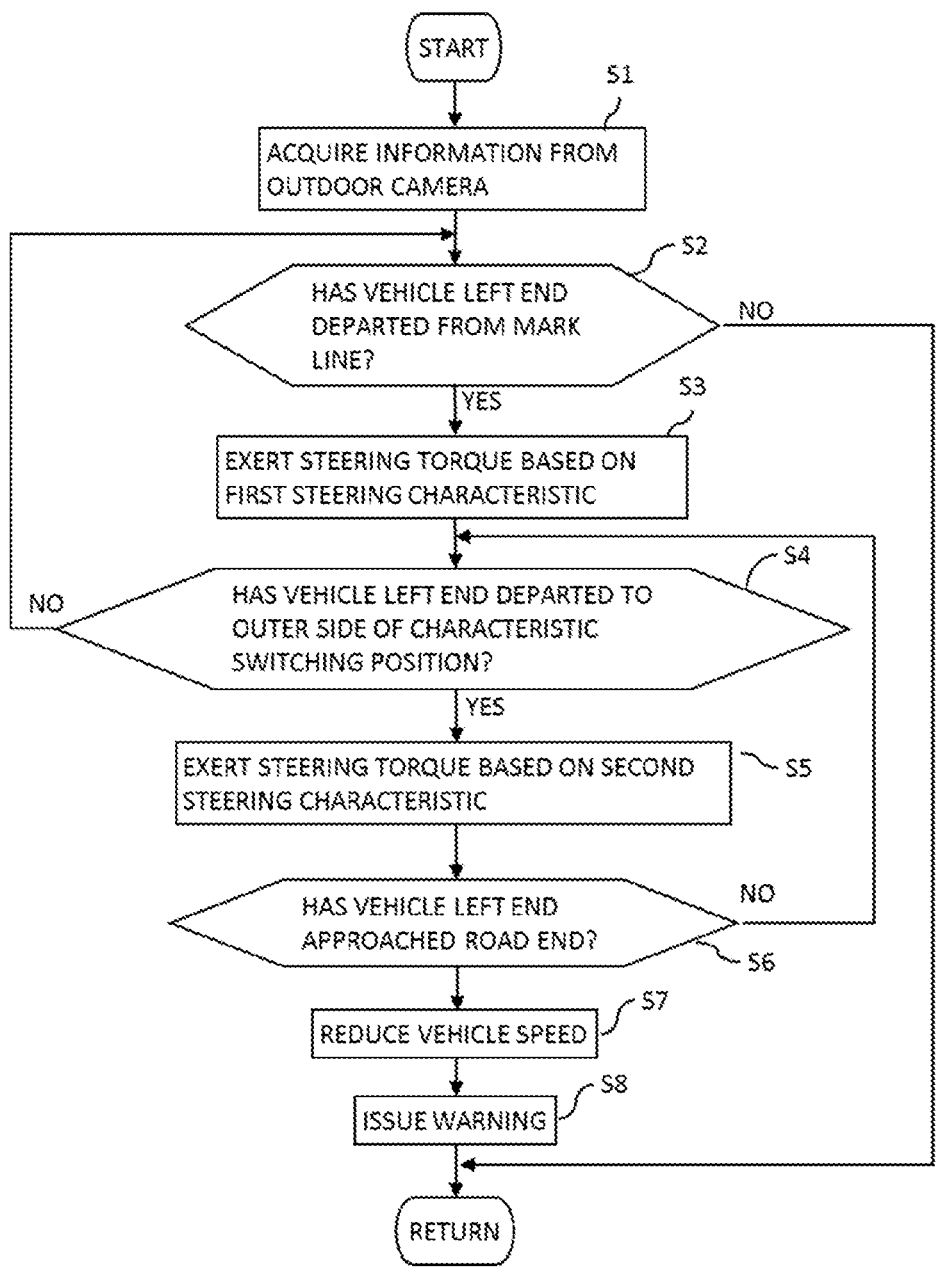
FIG. 5 is a flowchart illustrating first steering control that is executed by a control processor.
Figure 6:
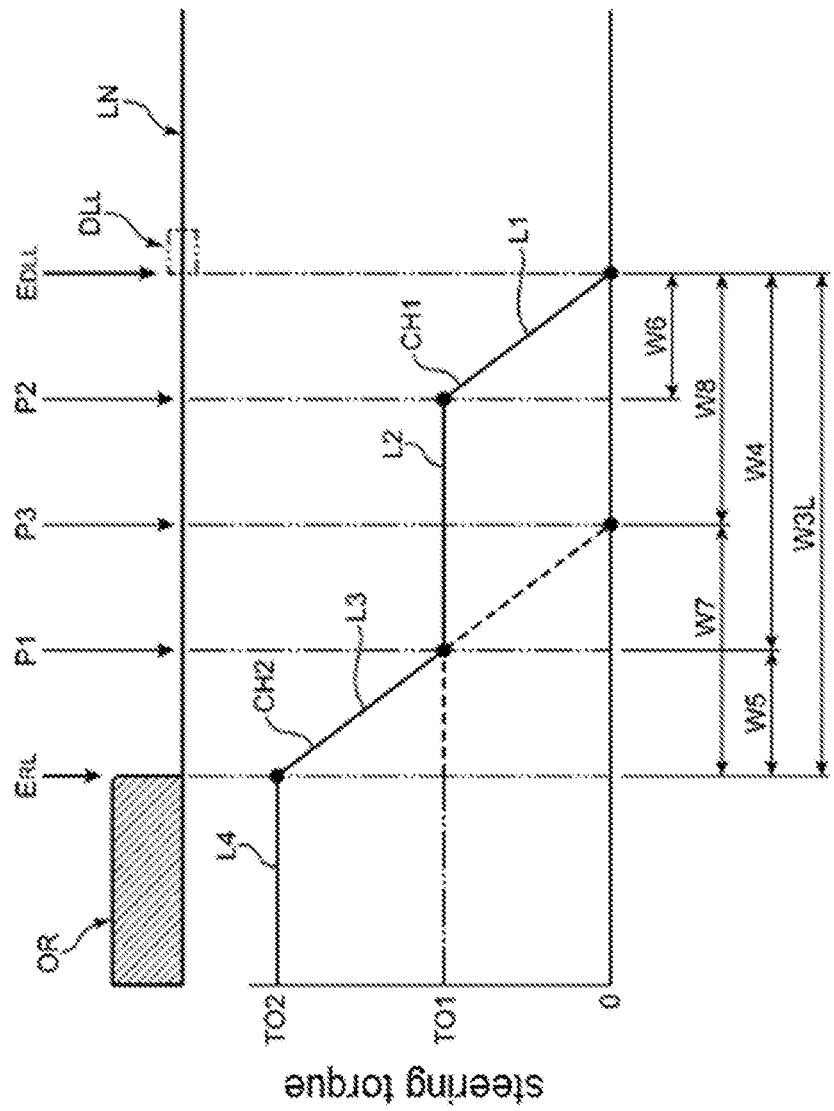
FIG. 6 is a schematic chart illustrating a relationship between the position of each of the mark line and the road end and steering torque to be exerted.
Figure 7A:
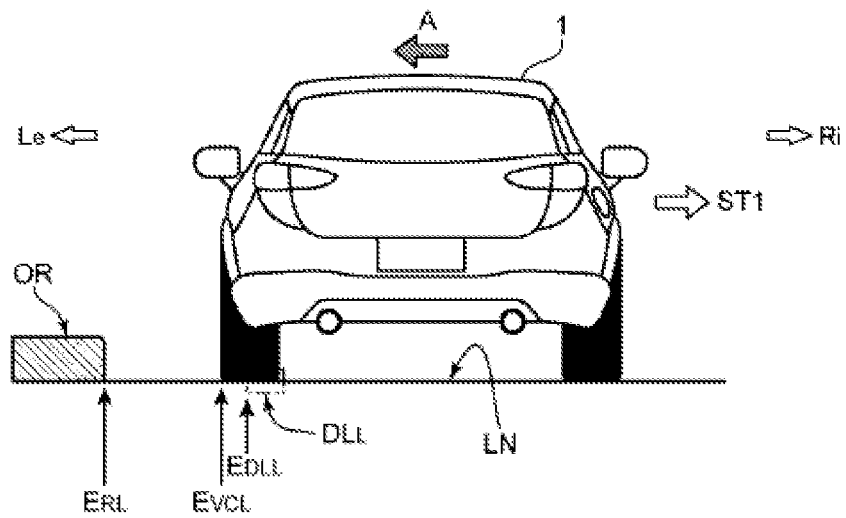
FIG. 7A is a schematic view illustrating a state where the vehicle starts moving into a side strip beyond the mark line.
Figure 7B:
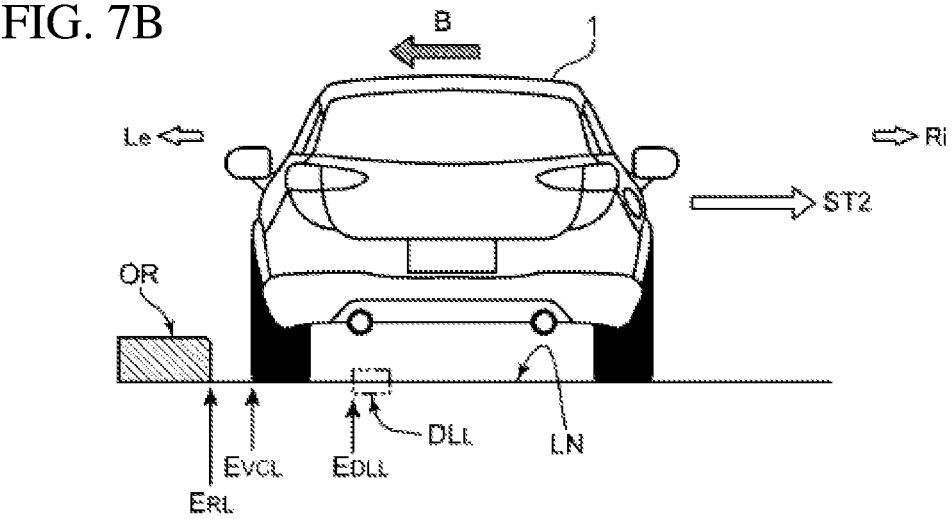
FIG. 7B is a schematic view illustrating a state where the vehicle further moves to a road end side in the side strip.

A description will be made on steering control (first steering control) in the case where the control processor 21 determines that the width W3L of the side strip is relatively wide with reference to FIG. 5 to FIG. 7. FIG. 5 is a flowchart illustrating the first steering control that is executed by the control processor 21. FIG. 6 is a schematic chart illustrating a relationship between the position of each of the roadway outer line $DL_L$ and the road end $E_{RL}$ and the steering torque to be exerted. FIG. 7A is a schematic view illustrating a state where the vehicle 1 starts moving into the side strip beyond the roadway outer line $DL_L$, and FIG. 7B is a schematic view illustrating a state where the vehicle 1 further moves to the road end $E_{RL}$ side in the side strip.

As illustrated in FIG. 5, the control processor 21 acquires detection results (a detection result of each of the roadway outer line $DL_L$, the roadway center line $DL_R$, and the road end $E_{RL}$) from the outdoor camera 18 (step S1). Based on the acquired detection results, the control processor 21 calculates each of the values W1L, W1R, W2L, W3L illustrated in FIG. 4. The flowchart illustrated in FIG. 5 illustrates the control that is executed by the control processor 21 in the case where the calculated value W3L (the width of the side strip) is larger than a specified value that is defined in advance.

Referring back to FIG. 5, the control processor 21 determines whether the vehicle left end $E_{VCL}$ has moved (departed) to the road end $E_{RL}$ side from the roadway outer line $DL_L$ (step S2). If the control processor 21 determines that the vehicle left end $E_{VCL}$ has not departed to the road end $E_{RL}$ side from the roadway outer line $DL_L$ (step S2: NO), the processing returns.

On the other hand, if the control processor 21 determines that the vehicle left end $E_{VCL}$ has departed to the road end $E_{RL}$ side from the roadway outer line $DL_L$ (step S2: YES), the first steering torque exerting section 211 commands the steering actuator 14 to exert the steering torque (a first steering force) based on a first steering characteristic (step S3). As illustrated in FIG. 7A, the steering actuator 14 thus commanded exerts the steering torque to bring the vehicle 1, which is about to depart to the road end $E_{RL}$ side as indicated by an arrow A, back to a center side of the lane LN as indicated by an arrow ST1.

As illustrated in FIG. 6, a first steering characteristic CH1 is a characteristic in which the steering torque is set in a manner to correspond to a position in a direction toward the road end $E_{RL}$ with the left mark line outer end $E_{DLL}$ of the roadway outer line $D_{LL}$ as an origin. More specifically, the first steering characteristic CH1 has: a torque increased section (a steering force increased section) L1 in which the steering torque is gradually increased to a first torque value TO1 in a range from the left mark line outer end $E_{DLL}$ to a position P2; and a torque maintained section L2 in which the first torque value TO1 is maintained in a range from the position P2 to a position (a characteristic switching position) P1.

Note that, as illustrated in FIG. 6, in this embodiment, a slope of the torque increased section L1 in the first steering characteristic CH1 is (TO1/W6). In addition, a width W4 from the left mark line outer end $E_{DLL}$ to the characteristic switching position P1 corresponds to the "specified value that is defined in advance" described above.

Referring back to FIG. 5, in the state of commanding the steering actuator 14 to exert the steering torque (the first steering force) based on the first steering characteristic CH1, the control processor 21 determines whether the vehicle left end $E_{VCL}$ has moved (departed) to the outer side (the road end $E_{RL}$ side) from the characteristic switching position P1 (step S4). If the control processor 21 determines that the vehicle left end $E_{VCL}$ has not moved (departed) to the road end $E_{RL}$ side from the characteristic switching position P1 (step S4: NO), the processing returns to the determination in step S2.

Here, if, due to the exertion of the steering torque (the first steering force) based on the first steering characteristic CH1, the vehicle left end $E_{VCL}$ of the vehicle 1 moves back to the right side (the center side of the lane LN) of the left mark line outer end $E_{DLL}$ of the roadway outer line $DL_L$, the determination of "NO" is made in step S2, and the processing returns. Accordingly, the command for the steering actuator 14 to exert the steering torque is canceled.

Note that the characteristic switching position setting section 213 in the control processor 21 sets the characteristic switching position P1, and the detailed description thereon will be made later.

On the other hand, if the control processor 21 determines that the vehicle left end $E_{VCL}$ has departed to the road end $E_{RL}$ side from the characteristic switching position P1 (step S4: YES), the second steering torque exerting section 212 commands the steering actuator 14 to exert the steering torque (a second steering force) based on a second steering characteristic CH2 (step S5). That is, the control processor 21 commands the steering actuator 14 to switch from the first steering characteristic CH1 to the second steering characteristic CH2 so as to exert the steering torque (the second steering force).

As illustrated in FIG. 7B, the steering actuator 14, which has received the command, exerts the higher steering torque (second steering force) than before (than the first steering force) to bring the vehicle 1, which is about to depart further to the road end $E_{RL}$ side as indicated by an arrow B, back to the center side of the lane LN as indicated by an arrow ST2.

As illustrated in FIG. 6, the second steering characteristic CH2 is a characteristic in which the steering torque is set in the manner to correspond to the position in the direction toward the road end $E_{RL}$ with a position P3 as the origin. More specifically, the second steering characteristic CH2 has: a torque increased section (a steering force increased section) L3 in which the steering torque is gradually increased to a second torque value TO2 in a range from the position P3 to the road end $E_{RL}$; and a torque maintained section L4 in which the second torque value TO2 is maintained in a range on the outer side of the road end $E_{RL}$ (the off-road OR).

Note that, as illustrated in FIG. 6, in this embodiment, a slope of the torque increased section L3 in the second steering characteristic CH2 is set as (TO2/W7), and, as an example in this embodiment, is set to be substantially the same as the slope (TO1/W6) of the torque increased section L1 in the first steering characteristic CH1 described above.

In addition, because the first steering characteristic CH1 and the second steering characteristic CH2 overlap each other in the range from the position P3 to the characteristic switching position P1, the range where the steering torque based on the second steering characteristic CH2 is exerted is actually a range with a width W5 from the characteristic switching position P1 to the road end $E_{RL}$.

Furthermore, a width W8 from the left mark line outer end $E_{DLL}$ to the position P3 as the origin of the second steering characteristic CH2 varies in accordance with the width W3L of the side strip. That is, in this embodiment, as an example, in the second steering characteristic CH2, the position P3 as the origin thereof moves in a width direction (a lateral direction) in a state where the slope of the torque increased section L3 and the like are maintained. The description thereon will be made later.

Referring back to FIG. 5, in the state of commanding the steering actuator 14 to exert the steering torque (the second steering force) based on the second steering characteristic CH2, the control processor 21 determines whether the vehicle left end $E_{VCL}$ has approached the road end $E_{RL}$ (step S6). If the control processor 21 determines that the vehicle left end $E_{VCL}$ has not approached the road end $E_{RL}$ (step S6: NO), the processing returns to the determination in step S4. Note that a definition of "approach" in the determination in step S6 can be changed in accordance with the road condition, a vehicle speed, or the like. As an example, a state where the vehicle left end $E_{VCL}$ approaches the road end $E_{RL}$ within 1 to 5 cm can be set.

Here, in the case where the processing returns to the determination in step S4, if, due to the exertion of the steering torque (the second steering force) based on the second steering characteristic CH2, the vehicle left end $E_{VCL}$ of the vehicle 1 moves back to the right side (the center side of the lane LN) of the characteristic switching position P1, the determination of "NO" is made in step S4, and the processing further returns the determination in step S2. Then, similar to the above, if, due to the exertion of the steering torque (the second steering force) based on the second steering characteristic CH2, the vehicle left end $E_{VCL}$ of the vehicle 1 moves back to the right side (the center side of the lane LN) of the left mark line outer end $E_{DLL}$ of the roadway outer line $DL_L$, the determination of "NO" is made in step S2, and the processing returns. Accordingly, the command for the steering actuator 14 to exert the steering torque is canceled.

On the other hand, if the control processor 21 determines that the vehicle left end $E_{VCL}$ has approached the road end $E_{RL}$ (step S6: YES), the control processor 21 actuates the brakes 7l, 7r, 9l, 9r to reduce a rotational frequency of the engine 2 and thereby reduce the vehicle speed (step S7), and commands the alarm 20 to issue the warning (step S8).

5. Steering Control in the Case where Width W3L of Side Strip is Relatively Narrow (Second Steering Control)

Figure 9:
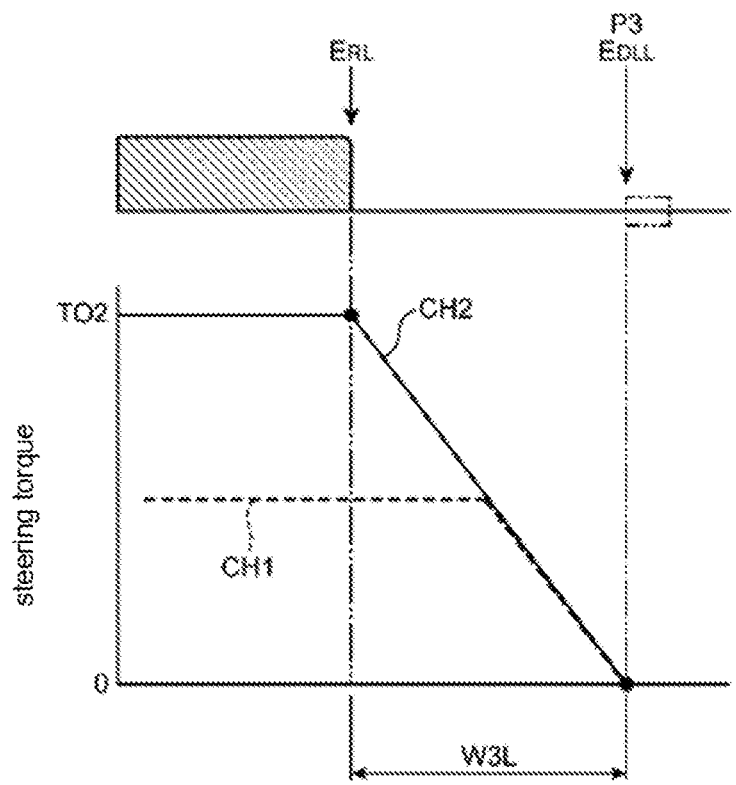
FIG. 9 is a schematic chart illustrating the relationship between the position of each of the mark line and the road end and the steering torque to be exerted in the case where a width of the side strip is narrower than a specified width.

A description will be made on steering control (second steering control) in the case where the control processor 21 determines that the width W3L of the side strip is relatively narrow with reference to FIG. 8 and FIG. 9. FIG. 8 is a flowchart illustrating the second steering control that is executed by the control processor 21. FIG. 9 is a schematic chart illustrating the relationship between the position of each of the left mark line outer end $E_{DLL}$ of the roadway outer line $DL_L$ and the road end $E_{RL}$ and the steering torque to be exerted.

As illustrated in FIG. 8, the control processor 21 acquires the detection results (the detection result of each of the roadway outer line $DL_L$, the roadway center line $DL_R$, and the road end $E_{RL}$) from the outdoor camera 18 (step S11). Similar to the above, based on the acquired detection results, the control processor 21 calculates each of the values W1L, W1R, W2L, W3L illustrated in FIG. 4. The flowchart illustrated in FIG. 8 illustrates the control that is executed by the control processor 21 in the case where the calculated value W3L (the width of the side strip) is smaller than the specified value that is defined in advance.

Referring back to FIG. 8, the control processor 21 determines whether the vehicle left end $E_{VCL}$ has moved (departed) to the road end $E_{RL}$ side from the roadway outer line $DL_L$ (step S12). If the control processor 21 determines that the vehicle left end $E_{VCL}$ has not departed to the road end $E_{RL}$ side from the roadway outer line $DL_L$ (step S12: NO), the processing returns.

On the other hand, if the control processor 21 determines that the vehicle left end $E_{VCL}$ has departed to the road end $E_{RL}$ side from the roadway outer line $DL_L$ (step S12: YES), the second steering torque exerting section 212 commands the steering actuator 14 to exert the steering torque (the second steering force) based on the second steering characteristic CH2 (step S13). Here, in this control, a reason why the steering actuator 14 is commanded to exert the steering torque based on the second steering characteristic CH2 from the beginning instead of the steering torque based on the first steering characteristic CH1 is that the width of the side strip is narrower than the specified value.

That is, as illustrated in FIG. 9, in this control, the position P3 as the origin of the second steering characteristic CH2 is set in a manner to match the left mark line outer end $E_{DLL}$ of the roadway outer line $DL_L$. The second steering characteristic CH2 illustrated in FIG. 9 is similar to that described above. However, depending on the width W3L of the side strip, a setting range (a width W7 in FIG. 6) of the torque increased section L3 in the second steering characteristic CH2 can also be set narrow according to the width W3L of the side strip.

Referring back to FIG. 8, in the state of commanding the steering actuator 14 to exert the steering torque (the second steering force) based on the second steering characteristic CH2, the control processor 21 determines whether the vehicle left end $E_{VCL}$ has approached the road end $E_{RL}$ (step S14). If the control processor 21 determines that the vehicle left end $E_{VCL}$ has not approached the road end $E_{RL}$ (step S14: NO), the processing returns to the determination in step S12. Note that the definition of "approach" in the determination in step S14 is the same as that described above.

Here, in the case where the processing returns to the determination in step S12, if, due to the exertion of the steering torque (the second steering force) based on the second steering characteristic CH2, the vehicle left end $E_{VCL}$ of the vehicle 1 moves back to the right side (the center side of the lane LN) of the left mark line outer end $E_{DLL}$ of the roadway outer line $DL_L$, the determination of "NO" is made in step S12, and the processing returns. Accordingly, the command for the steering actuator 14 to exert the steering torque is canceled.

On the other hand, if the control processor 21 determines that the vehicle left end $E_{VCL}$ has approached the road end $E_{RL}$ (step S14: YES), similar to the above, the control processor 21 actuates the brakes 7l, 7r, 9l, 9r to reduce the rotational frequency of the engine 2 and thereby reduce the vehicle speed (step S15), and commands the alarm 20 to issue the warning (step S16).

6. Method for Selecting First Steering Control or Second Steering Control by Control Processor 21

As described above, in the steering control of the vehicle 1 according to this embodiment, the first steering control, in which the steering torque based on the first steering characteristic CH1 or the steering torque based on the second steering characteristic CH2 is exerted in accordance with a degree of the departure of the vehicle 1, or the second steering control, in which the steering torque based on the second steering characteristic CH2 is exerted initially from the time when the vehicle 1 departs the roadway outer line $DL_L$, is selectively executed. Such selection of the control is made on the basis of whether the width W3L of the side strip is wider or narrower than the specified value. This method for selecting will be described with reference to FIG. 10 to FIG. 12.

Figure 10:
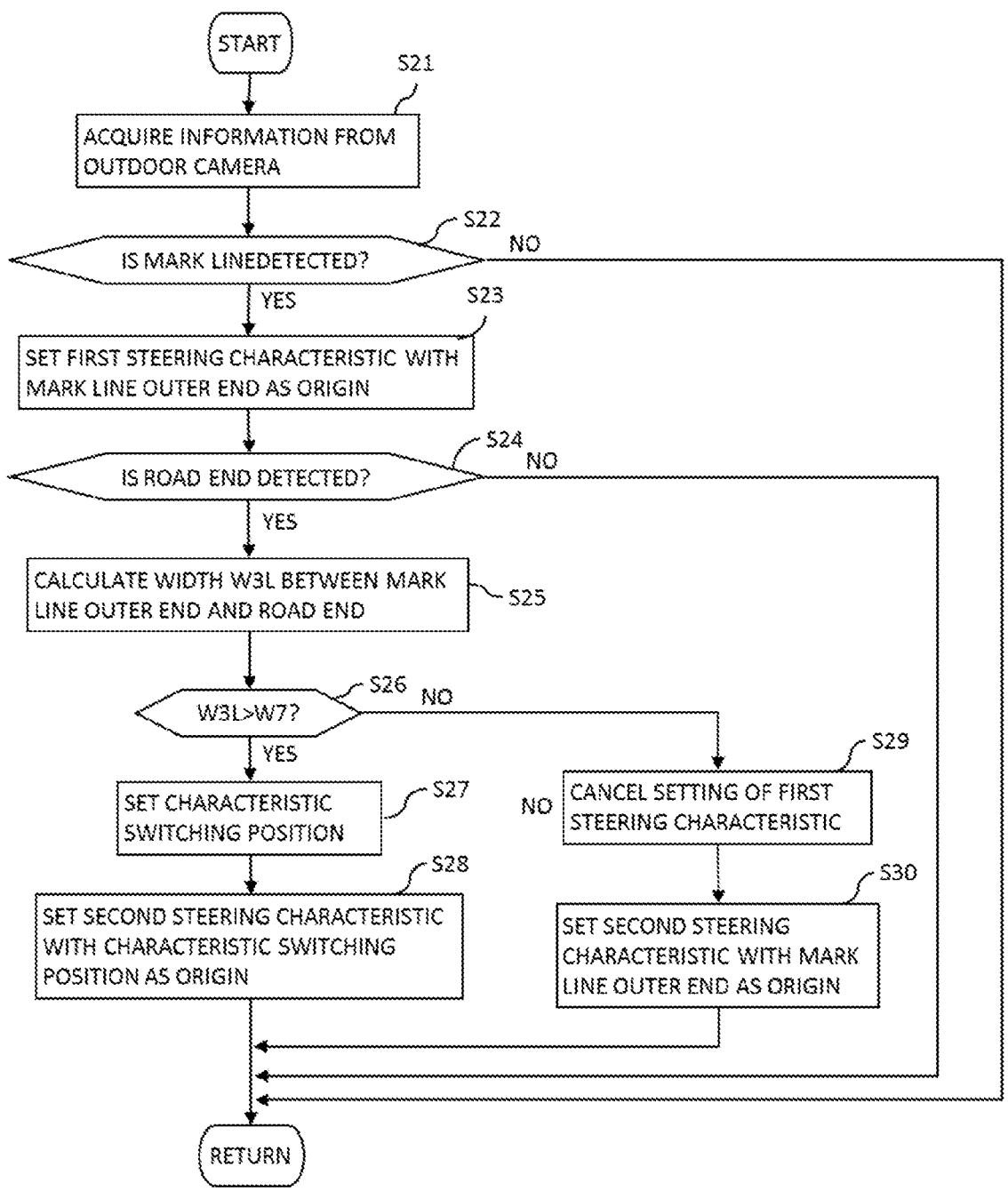
FIG. 10 is a flowchart illustrating a method for selecting the first steering control or the second steering control by the control processor.
Figure 11:
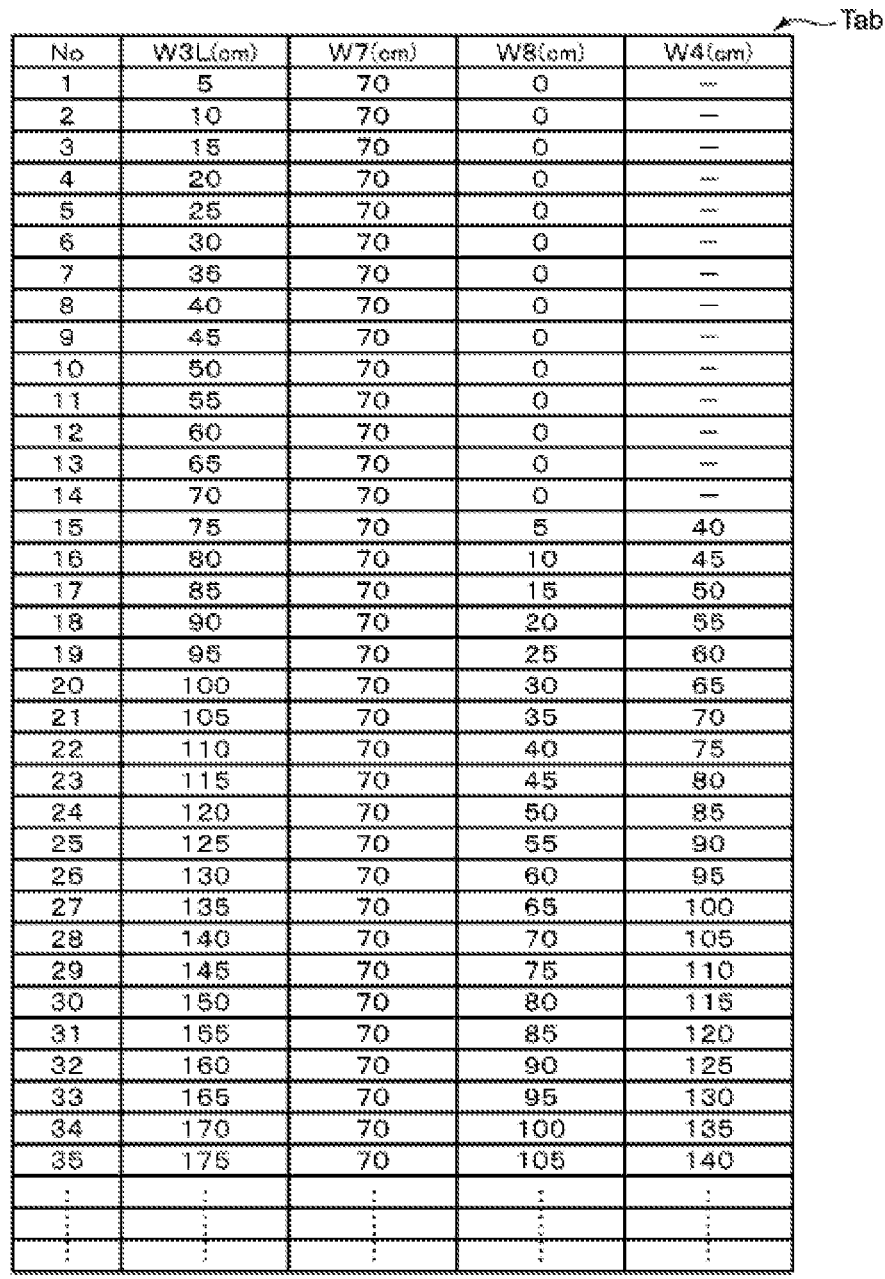
FIG. 11 is a schematic view illustrating a reference table that is stored in a table storage section.
Figure 12A:
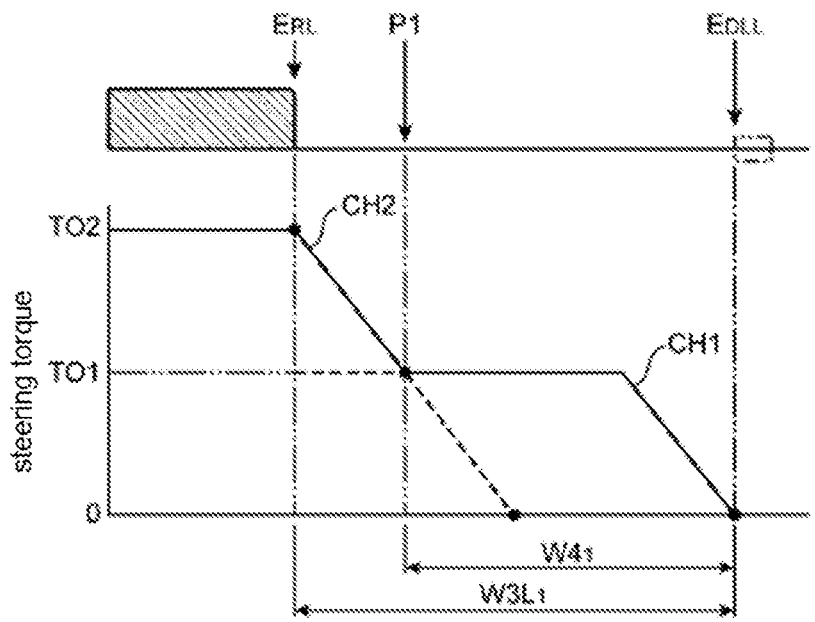
FIG. 12A is a schematic chart illustrating the positions of the mark line and the road end, a first steering characteristic, and a second steering characteristic in the case where the width of the side strip is relatively wide.
Figure 12B:
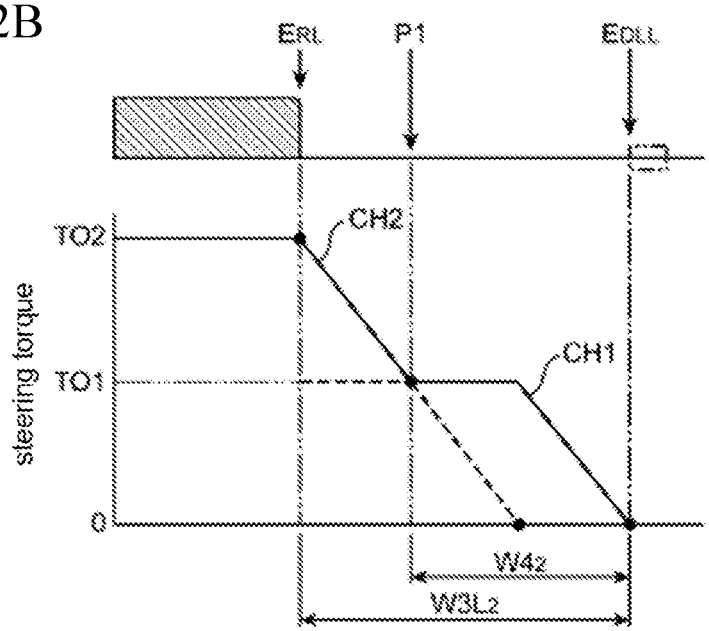
FIG. 12B is a schematic chart illustrating the positions of the mark line and the road end, the first steering characteristic, and the second steering characteristic in the case where the road side width is narrower than that in the state illustrated in FIG. 12A.

FIG. 10 is a flowchart illustrating the method for selecting the first steering control or the second steering control by the control processor 21. FIG. 11 is a schematic view illustrating a reference table Tab that is referred when the control processor 21 selects the control. FIG. 12A is a schematic chart illustrating the positions of the roadway outer line $DL_L$ and the road end $E_{RL}$, the first steering characteristic CH1, and the second steering characteristic CH2 in the case where the width W3L of the side strip is relatively wide, and FIG. 12B is a schematic chart illustrating the positions of the roadway outer line $DL_L$ and the road end $E_{RL}$, the first steering characteristic CH1, and the second steering characteristic CH2 in the case where the width W3L of the side strip is narrower than that in the state illustrated in FIG. 12A.

As illustrated in FIG. 10, also in the selection of the first steering control or the second steering control, the control processor 21 acquires the detection results (the detection result of each of the roadway outer line $DL_L$, the roadway center line $DL_R$, and the road end $E_{RL}$) from the outdoor camera 18 (step S21). Then, from the acquired detection results, the control processor 21 determines whether the roadway outer line $DL_L$ is detected (step S22). If the control processor 21 determines that the roadway outer line $DL_L$ is not detected (step S22: NO), the processing returns.

On the other hand, if the control processor 21 determines that the roadway outer line $DL_L$ is detected (step S22: YES), the control processor 21 sets the first steering characteristic CH1 with the left mark line outer end $E_{DLL}$ of the roadway outer line $DL_L$ as the origin (step S23). That is, as illustrated in FIG. 12A and FIG. 12B, the control processor 21 sets the first steering characteristic CH1 with the left mark line outer end $E_{DLL}$ as the origin.

Then, from the acquired detection results, the control processor 21 determines whether the road end $E_{RL}$ is detected (step S24). If the control processor 21 determines that the road end $E_{RL}$ is not detected (step S24: NO), the processing returns. As a case where the road end $E_{RL}$ is not detected, for example, a case where the vehicle 1 travels on a road with two or more lanes each way and the vehicle 1 travels on the lane LN that is a fast lane on the center side rather than a slow lane on the end side of the road is considered.

On the other hand, if the control processor 21 determines that the road end $E_{RL}$ is detected (step S24: YES), the control processor 21 calculates the width of the side strip, that is, the width W3L between the left mark line outer end $E_{DLL}$ of the roadway outer line $DL_L$ and the road end $E_{RL}$ (step S25). Then, the control processor 21 determines whether the calculated width W3L is wider than the setting range (the width W7) of the torque increased section L3 in the second steering characteristic CH2 (step S26).

If the control processor 21 determines that the width W3L is wider than the width W7 (step S26: YES), the control processor 21 executes the first steering control and sets the characteristic switching position P1 (step S27), and then sets the second steering characteristic CH2 with the characteristic switching position P1 as the origin (step S28).

The control processor 21 sets the characteristic switching position P1 with reference to the reference table Tab in FIG. 11, which is stored in the table storage section 214 in advance. More specifically, the control processor 21 sets W4 as the position of the characteristic switching position P1 by using stored data on No. 15 onward in the reference table Tab illustrated in FIG. 11. Note that a processor of each numerical value in the reference table is "cm".

In addition, in the reference table Tab according to this embodiment, W3L is set with 5 cm increments. In the case where W3L has an intermediate value, the numerical value of W3L less than 5 cm is rounded down to set the characteristic switching position P1.

With reference to FIG. 12A and FIG. 12B by comparison, in the case where the control processor 21 selects the first steering control, setting of the first steering characteristic CH1 with the left mark line outer end $E_{DLL}$ of the roadway outer line $DL_L$ as the origin is maintained, and the second steering characteristic CH2 moves parallel in a width direction. In conjunction with this movement, the characteristic switching position P1 moves from W41 to W42.

On the other hand, if the control processor 21 determines that the width W3L is equal to or narrower than the width W7 (step S26: NO), the control processor 21 executes the second steering control, cancels the first steering characteristic CH1 set in step S22 (step S29), and sets the second steering characteristic CH2 with the left mark line outer end $E_{DLL}$ of the roadway outer line $DL_L$ as the origin (step S30). That is, the steering characteristic as illustrated in FIG. 9 is set.

The control processor 21 determines the execution of the second steering control also on the basis of the reference table Tab. In this case, the control processor 21 refers to No. 1 to 14 in FIG. 11.

As it has been described so far, in the vehicle 1 according to this embodiment, the control processor 21 selects the first steering control or the second steering control.

Modified Embodiments

In the above embodiment, the control processor 21 selects the first steering control or the second steering control with reference to the reference table Tab, which is stored in the table storage section 214. However, the present disclosure is not limited thereto. For example, the reference table Tab can be adopted by correcting the values therein in accordance with the travel speed of the vehicle 1 during the selection of the control, or the like. More specifically, in the case where the vehicle speed is high, the values of the reference table Tab may be corrected to narrow the width W4 in comparison with that in the case where the vehicle speed is low. In this way, the second steering control, in which the steering torque based on the second steering characteristic CH2 is exerted, may be executed at an early stage of the departure.

In the above embodiment, in the case where the vehicle left end $E_{VCL}$ approaches the road end $E_{RL}$, the vehicle speed is reduced, and the warning is issued. However, these are not essential. Alternatively, only one of the reduction of the vehicle speed and the issuance of the warning may be made.

In the above embodiment, the torque maintained section L4 is also provided in the second steering characteristic CH2. However, the torque maintained section L4 is not essential. For example, in the case where the vehicle left end of the vehicle comes in contact with or is beyond the road end, the steering torque may not be exerted, and the vehicle may be stopped.

In the above embodiment, the engine 2 is adopted as the power source of the vehicle 1. However, the present disclosure is not limited thereto. For example, a case where an electric motor serves as a drive source can also be applied to the present disclosure.

In the above embodiment, the case where the vehicle 1 travels on the left lane LN is assumed. However, the present disclosure is not limited thereto. For example, the present disclosure can also be applied to a case of right-hand traffic. In this case, the first steering control or the second steering control can be selected with the width of the side strip between the mark line on the right side and the road end, which is located further on the right side of the mark line, as a reference.

What is claimed is:

1. A vehicle control apparatus that exerts a steering force on the vehicle in accordance with a travel situation for suppressing departure of a vehicle to an off-road which is a physical end of the road, the vehicle including a steering actuator configured to generate the steering force for the vehicle and a detector configured to detect a mark line extending along a travel direction of the vehicle on one lateral side of the vehicle and a road end on the one lateral side, the road end being adjacent to an outer side of the vehicle from the mark line and extending along the travel direction, the road end being a boundary between a side strip of the outer side of the mark line and the off-road, and the vehicle control apparatus comprising:
   a vehicle control processor configured to successively receive from the detector a detection result pertaining to the mark line and the road end and, based on the detection result,
   command the steering actuator to exert a first steering force, which is the steering force based on a first steering characteristic, in a case where the vehicle departs to the road end side from the mark line, the first steering force being exerted with a mark line outer end on the road end side of the mark line as an origin; and
   command the steering actuator to exert a second steering force, which is a larger steering force than the first steering force, based on a second steering characteristic differing from the first steering characteristic in a case where the vehicle departs to the road end side from the mark line, the second steering force being exerted with the road end as a reference and a position between the mark line outer end and the road end as an origin;
   wherein the vehicle control processor selectively executes the following in accordance with a width of a side strip between the mark line and the road end:
      first steering control in which the steering actuator generates the first steering force in a case where a lateral end of the vehicle is located within a range from the mark line to a specified position between the mark line and the road end and in which the steering actuator generates the second steering force in a case where the lateral end of the vehicle is located within a range from the specified position to the road end; or
      second steering control in which the steering actuator generates the second steering force in a case where the lateral end of the vehicle is located within a range from the mark line to the road end; and
   wherein
   when the control processor detects the road end, the control processor calculates the width of the side strip between the mark line outer end and the road end;
   the control processor determines whether the calculated width of the side strip is greater than a predetermined setting range where the second steering characteristic exerts the second steering force; and
   when the control processor determines that the width of the side strip is greater than the predetermined setting range, the control processor executes the first steering control.

2. The vehicle control apparatus according to claim 1, wherein
   the vehicle control processor is further configured to set the specified position to the road end side as the width of the side strip is increased and to set the specified position to the mark line side as the width of the side strip is reduced during execution of the first steering control.

3. The vehicle control apparatus according to claim 2, wherein
   each of the first steering characteristic and the second steering characteristic has a steering force increasing characteristic in which the steering force is gradually increased from the mark line side toward the road end side.

4. The vehicle control apparatus according to claim 3, wherein
   the vehicle control processor is further configured to command at least one of a reduction of a vehicle speed and issuance of a warning in a case where the vehicle departs to a state of approaching the road end.

5. The vehicle control apparatus according to claim 4, wherein
   the detector is configured as an image capturing device capable of capturing an image of outside of a cabin, and
   the vehicle control processor is configured to determine the detection result pertaining to the mark line and the road end based on the image captured by the image capturing device.

6. The vehicle control apparatus according to claim 1, further comprising a map information memory; wherein:
   the detector comprises a camera for detecting the road end, and
   the control processor determines the road end based on the map information memory and the detection of the road end by the camera.

7. The vehicle control apparatus according to claim 1, wherein the vehicle control processor executes the first steering control such that the steering force is constant when the lateral end of the vehicle is located within a range from a first predetermined position between the mark line and the specified position to the specified position.

8. The vehicle control apparatus according to claim 7, wherein
   the first steering force is a steering torque;
   the vehicle control processor executes the first steering control to command the steering actuator to exert the first steering force based on the first steering characteristic when the lateral end of the vehicle departs to the road end side from the mark line; and
   the steering actuator exerts the first steering force to bring the vehicle back to a center of a lane bounded on one side by the mark line.

9. The vehicle control apparatus according to claim 7, wherein in the first steering characteristic, a steering torque corresponds to a position of the lateral end of the vehicle between the mark line outer end as an origin and the road end;
   the first steering characteristic having a torque increased section which is a steering force increased section in which the steering torque is gradually increased to a first torque value in a range from the mark line outer end to the first predetermined position, and a torque maintained section in which the first torque value is maintained in a range from the first predetermined position to the specified position.

10. The vehicle control apparatus according to claim 9, wherein in the second steering characteristic, a steering torque corresponds to a position of the lateral end of the vehicle between a second predetermined position as an origin and the road end, the second predetermined position being between the first predetermined position and the specified position;
   the second steering characteristic having a torque increased section which is a steering force increased section in which the steering torque is gradually increased to a second torque value in a range from the second predetermined position to the road end, and a torque maintained section in which the second torque value is maintained in a range from the road end to the off-road.

11. The vehicle control apparatus according to claim 10, wherein a slope of the torque increased section of the second steering characteristic is substantially the same as a slope of the torque increased section of the first steering characteristic.

12. A vehicle control method that exerts a steering force on the vehicle in accordance with a travel situation for suppressing departure of a vehicle to an off-road which is a physical end of the road, the vehicle control method comprising:
- detecting a mark line extending along a travel direction of the vehicle on one lateral side of the vehicle;
- detecting a road end on the one lateral side, the road end being adjacent to an outer side of the vehicle from the mark line and extending along the travel direction; and
- exerting the steering force on the vehicle based on a detection result detected in each of the mark line detecting and the road end detecting, the exerting the steering force including:
  - exerting a first steering force, which is the steering force based on a first steering characteristic, in a case where the vehicle departs to the road end side from the mark line, the first steering force being the steering force that is exerted with an outer end on the road end side of the mark line as an origin; and
  - exerting a second steering force, which is a larger steering force than the first steering force, based on a second steering characteristic differing from the first steering characteristic in a case where the vehicle departs to the road end side from the mark line, the second steering force being the steering force that is exerted with the road end as a reference and a position between the outer end and the road end as an origin;
- wherein the following is selectively executed during the steering force exerting:
  - first steering control in which, in accordance with a width of a side strip between the mark line and the road end, the first steering force is exerted in a case where a lateral end of the vehicle is located within a range from the mark line to a specified position between the mark line and the road end and in which the second steering force is exerted in a case where the lateral end of the vehicle is located within a range from the specified position to the road end; or
  - second steering control in which the second steering force is exerted in a case where the lateral end of the vehicle is located within a range from the mark line to the road end; and
- wherein the method further comprises:
- calculating, during the road end detecting, the width of the side strip between the mark line outer end and the road end;
- determining whether the calculated width of the side strip is greater than a predetermined setting range where the second steering characteristic exerts the second steering force; and
- when it is determined that the width of the side strip is greater than the predetermined setting range, executing the first steering control.

13. The vehicle control method according to claim 12, wherein
the exerting the steering force further includes:
- setting the specified position to the road end side as the width of the side strip is increased; and
- setting the specified position to the mark line side as the width of the side strip is reduced during execution of the first steering control.

14. The vehicle control method according to claim 12, wherein detecting the road end comprises using a camera;
the method comprising determining the road end using a map information memory and the detection of the road end by the camera.

15. The vehicle control method according to claim 12, comprising executing the first steering control such that the steering force is constant when the lateral end of the vehicle is located within a range from a predetermined position between the mark line and the specified position to the specified position.

\* \* \* \* \*